(12) United States Patent
Justin et al.

(10) Patent No.: US 11,443,026 B2
(45) Date of Patent: Sep. 13, 2022

(54) SYNCHRONIZING DATA ACROSS MULTIPLE INSTANCES OF AN APPLICATION IN A CLOUD

(71) Applicant: INTERNATIONAL BUSINESS MACHINES CORPORATION, Armonk, NY (US)

(72) Inventors: Josephine E. Justin, Bangalore (IN); Srinivasan Nanduri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1529 days.

(21) Appl. No.: 15/299,185

(22) Filed: Oct. 20, 2016

(65) Prior Publication Data

US 2018/0113896 A1   Apr. 26, 2018

(51) Int. Cl.
*G06F 16/27* (2019.01)
*G06F 16/23* (2019.01)
*G06F 21/44* (2013.01)
*H04L 67/1095* (2022.01)

(52) U.S. Cl.
CPC .............. *G06F 21/44* (2013.01); *G06F 16/23* (2019.01); *G06F 16/273* (2019.01); *H04L 67/1095* (2013.01)

(58) Field of Classification Search
CPC ...... G06F 16/178; G06F 16/27; G06F 16/182; G06F 16/183; G06F 16/1873; G06F 16/2315; G06F 16/2329; G06F 16/2365; G06F 16/2372; G06F 16/2393; G06F 16/275; G06F 16/285; G06F 21/305; G06F 9/4416; G06F 9/442; G06F 9/44505; G06F 9/449; G06F 16/273; G06F 21/44; G06F 16/23; H04L 67/1095
USPC .......................................... 707/624, 622, 610
See application file for complete search history.

(56) References Cited

U.S. PATENT DOCUMENTS

| | | |
|---|---|---|
| 8,073,922 B2 | 12/2011 | Bates |
| 8,412,810 B1 * | 4/2013 | Tompkins ............... H04L 41/00 709/224 |
| 8,675,687 B2 * | 3/2014 | Piwonka ............... G06F 16/178 370/503 |
| 9,084,281 B2 * | 7/2015 | Lu ........................... H04W 4/60 |
| 9,135,321 B2 | 9/2015 | Novik et al. |
| 2009/0198702 A1 * | 8/2009 | Novik ..................... G06F 16/27 |

(Continued)

*Primary Examiner* — Alford W Kindred
*Assistant Examiner* — Cecile H Vo
(74) *Attorney, Agent, or Firm* — Tutunjian & Bitetto, P.C.; Scott Dobson

(57) ABSTRACT

A method and system are provided for data synchronization. The method includes registering, in a database accessible by nodes in a cloud cluster system, node information for each node during an initialization of an application context for an application having at least one instance running on each node. The method further includes storing an update for data in (i) a local storage of a given one of the nodes and (ii) the database, responsive to a request to update the data received by the given one of the nodes. The method also includes generating a modified request that includes details for the updated data. The method additionally includes calling an application programming interface to update a state of respective local storages for the other nodes with the update responsive to the modified request, such that the update is synchronized across the at least one instance running on each node.

20 Claims, 13 Drawing Sheets

(56) References Cited

U.S. PATENT DOCUMENTS

| | | | | |
|---|---|---|---|---|
| 2010/0262958 | A1* | 10/2010 | Clinton | G06F 8/65 |
| | | | | 717/171 |
| 2012/0102080 | A1* | 4/2012 | Kirihata | G06F 16/1774 |
| | | | | 707/831 |
| 2013/0159451 | A1* | 6/2013 | Luciw | H04L 67/568 |
| | | | | 709/213 |
| 2014/0201140 | A1* | 7/2014 | Vibhor | H04L 67/1097 |
| | | | | 707/622 |
| 2015/0127795 | A1* | 5/2015 | Jagana | H04L 63/20 |
| | | | | 709/223 |
| 2015/0370827 | A1* | 12/2015 | Parkison | G06F 16/178 |
| | | | | 707/610 |
| 2016/0063083 | A1 | 3/2016 | Mu et al. | |
| 2016/0070772 | A1 | 3/2016 | Chatterjee et al. | |

* cited by examiner

SYNCHRONIZING DATA ACROSS MULTIPLE INSTANCES OF AN APPLICATION IN A CLOUD

BACKGROUND

Technical Field

The present invention relates generally to information processing and, in particular, to synchronizing data across multiple instances of an application in a cloud.

Description of the Related Art

In a cloud system, multiple instances of an application can be used to improve the performance of the application and the system. It is always important for the multiple instances to be kept synchronized, particularly from their data perspective. Such synchronization is generally required from various aspects of the application and the complete system. Moreover, such synchronization is required for better performance of the system, better scalability, and for the data to be available anytime to the instances without the dependency of database calls (as database calls are costly at run-time).

In any cloud application, we always have two types of data requirements, as follows: (a) real-time data; and (b) cached data. Real-time data is data that is required to be always fetched from a database. In general, real-time data is either huge in size or changing quiet often or used very rarely. Cached data is data which is modified rarely but used quiet often. Thus, cached data needs to be cached locally for the application, so that the application does not have to retrieve the data from a database. A database call is made only when there is a change or if application context is initialized.

Thus, there is a need for an approach for synchronizing data across multiple instances of an application in a cloud.

SUMMARY

According to an aspect of the present principles, a method is provided for data synchronization. The method includes registering, in a database accessible by a plurality of nodes included in a cloud cluster system, node information for each of the plurality of nodes during an initialization of an application context for an application having at least one instance of multiple instances running on each of the plurality of nodes. The method further includes storing an update for data in (i) a local storage of a given one of the plurality of nodes and (ii) the database, responsive to a request to update the data received by the given one of the plurality of nodes. The method also includes generating a modified version of the request that includes details for the updated data. The method additionally includes calling an application programming interface (API) to update a state of respective local storages for other ones of the plurality of nodes with the update responsive to the modified version of the request, such that the update is synchronized across the at least one instance of the multiple instances running on each of the plurality of nodes.

According to another aspect of the present principles, a computer program product is provided for data synchronization. The computer program product includes a non-transitory computer readable storage medium having program instructions embodied therewith. The program instructions are executable by a computer to cause the computer to perform a method. The method includes registering, in a database accessible by a plurality of nodes included in a cloud cluster system, node information for each of the plurality of nodes during an initialization of an application context for an application having at least one instance of multiple instances running on each of the plurality of nodes. The method further includes storing an update for data in (i) a local storage of a given one of the plurality of nodes and (ii) the database, responsive to a request to update the data received by the given one of the plurality of nodes. The method also includes generating a modified version of the request that includes details for the updated data. The method additionally includes calling an application programming interface (API) to update a state of respective local storages for other ones of the plurality of nodes with the update responsive to the modified version of the request, such that the update is synchronized across the at least one instance of the multiple instances running on each of the plurality of nodes.

According to yet another aspect of the present principles, a cloud cluster system is provided. The cloud cluster system includes a plurality of nodes and a database accessible by the plurality of nodes. Each of the plurality of nodes has a local storage and is configured to register its node information in the database during an initialization of an application context for an application having at least one instance of multiple instances running on each of the plurality of nodes. The plurality of nodes are further configured such that responsive to a request to update data received by any given one of the plurality of nodes, the given one of the plurality of nodes (a) stores an update for the data in (i) the local storage of the given one of the plurality of nodes and (ii) the database, (b) generates a modified version of the request that includes details for the updated data, and (c) calls an application programming interface (API) to update a state of respective local storages for other ones of the plurality of nodes with the update responsive to the modified version of the request, such that the update is synchronized across the at least one instance of the multiple instances running on each of the plurality of nodes.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein.

DETAILED DESCRIPTION

The present invention is directed to synchronizing data across multiple instances of an application in a cloud.

In an embodiment, the present invention provides a method and system for easily maintaining cached data across multiple instances of an application in a cloud.

In an embodiment, data synchronization between the multiple instances can be facilitated by some of the middle-ware components on which the application is running. However, there may be situations where not all of the middle-ware components support the synchronization or may be times when some synchronization methodologies are unable to be used. That is, there are occasions where the application has to manage this on its own. In an embodiment, the present invention defines a methodology and corresponding system for the application to synchronize data between the multiple cluster nodes of the system on which the application is running.

Figure 1:
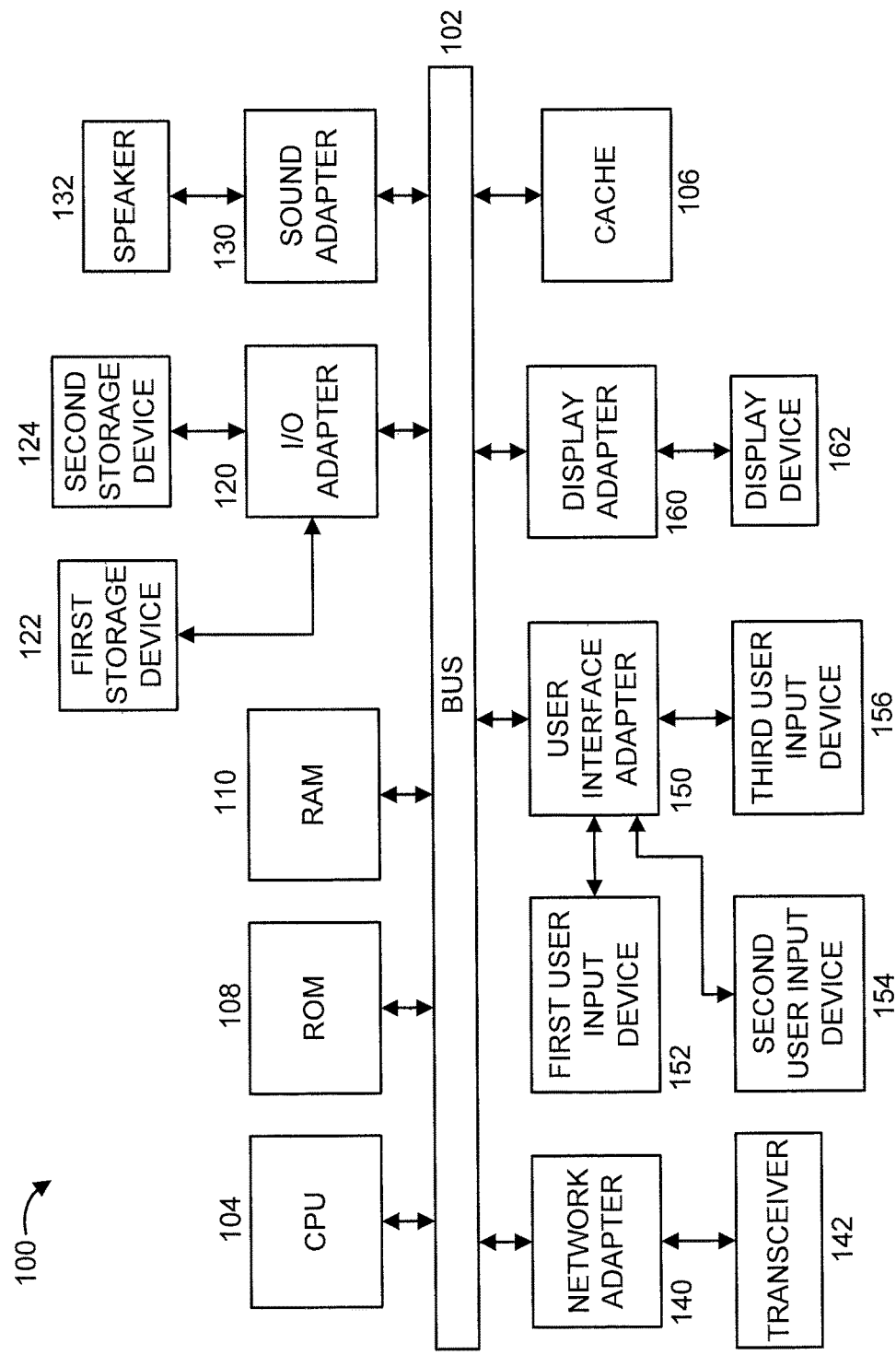
FIG. 1 shows an exemplary processing system to which the invention principles may be applied, in accordance with an embodiment of the present invention.

FIG. 1 shows an exemplary processing system 100 to which the invention may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
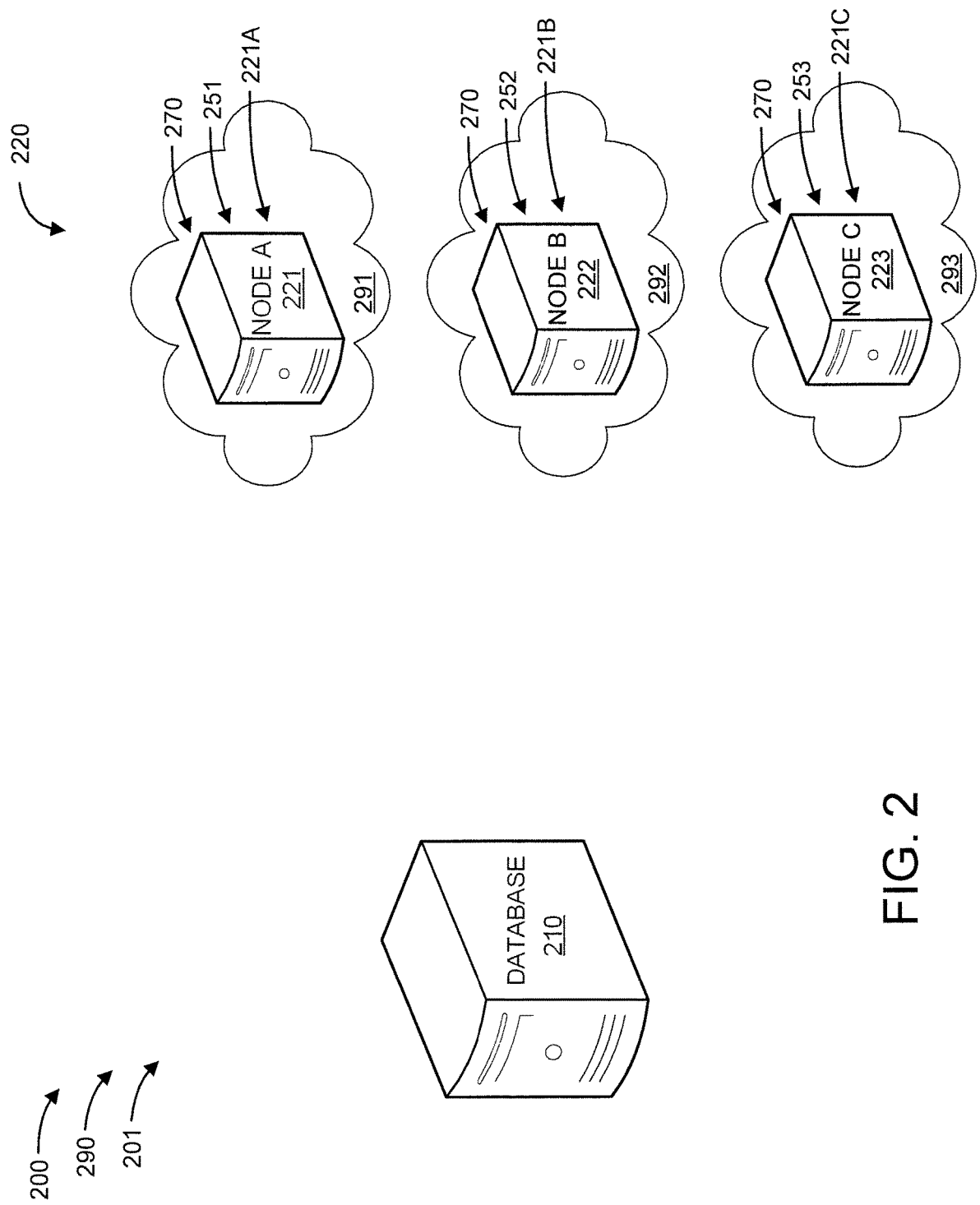
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
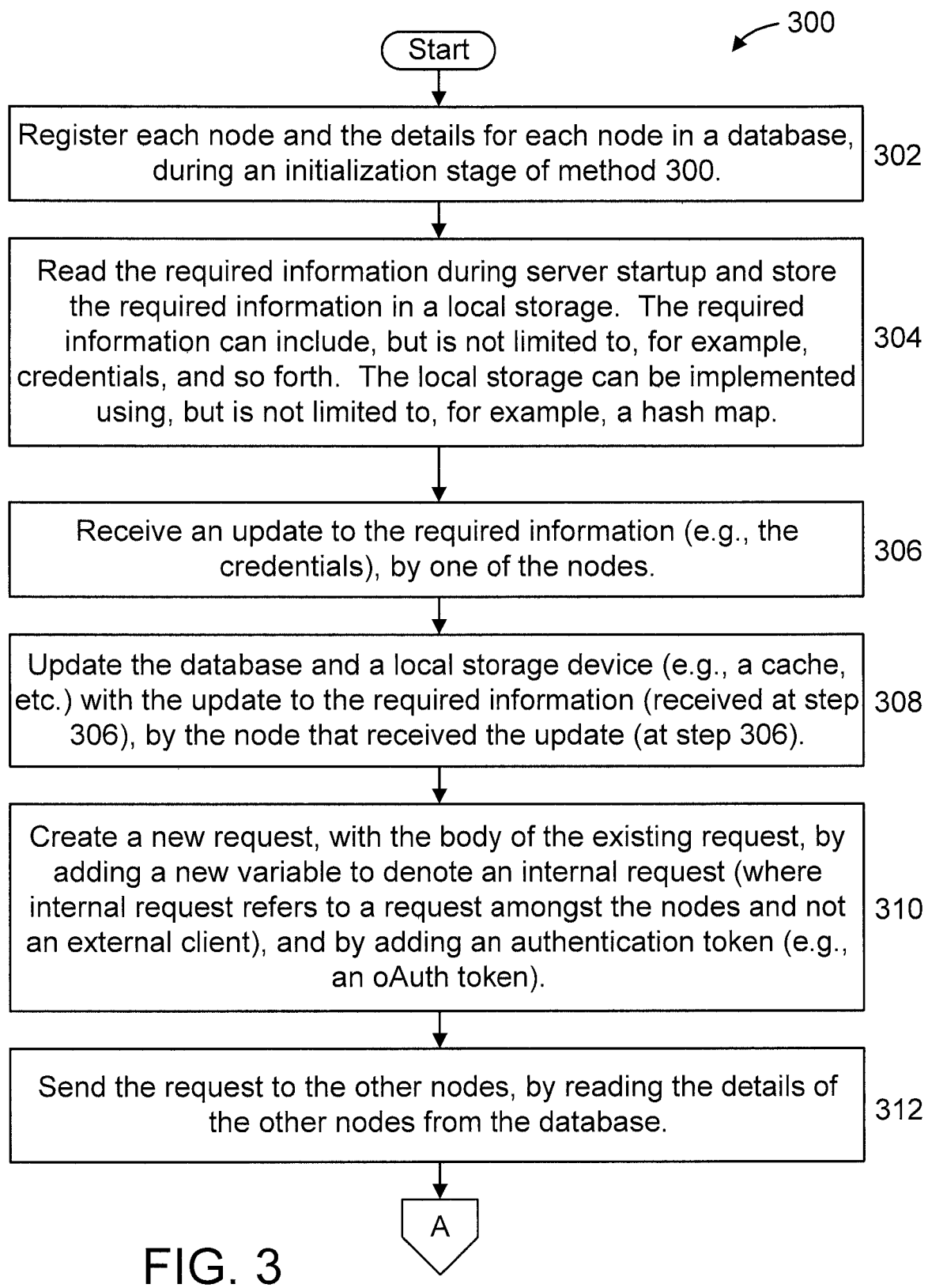
FIGS. 3-4 show an exemplary method for synchronizing data across multiple instances of an application in a cloud, in accordance with an embodiment of the present invention.
Figure 4:
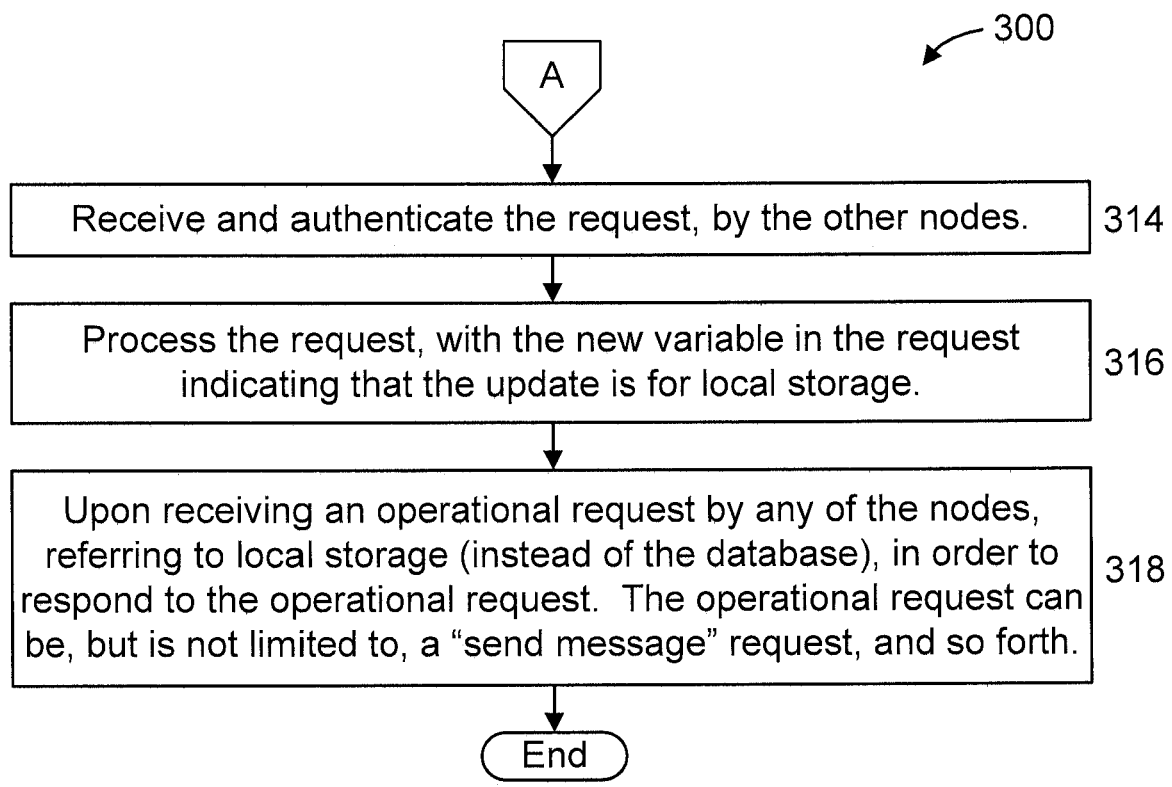
Figure 5:
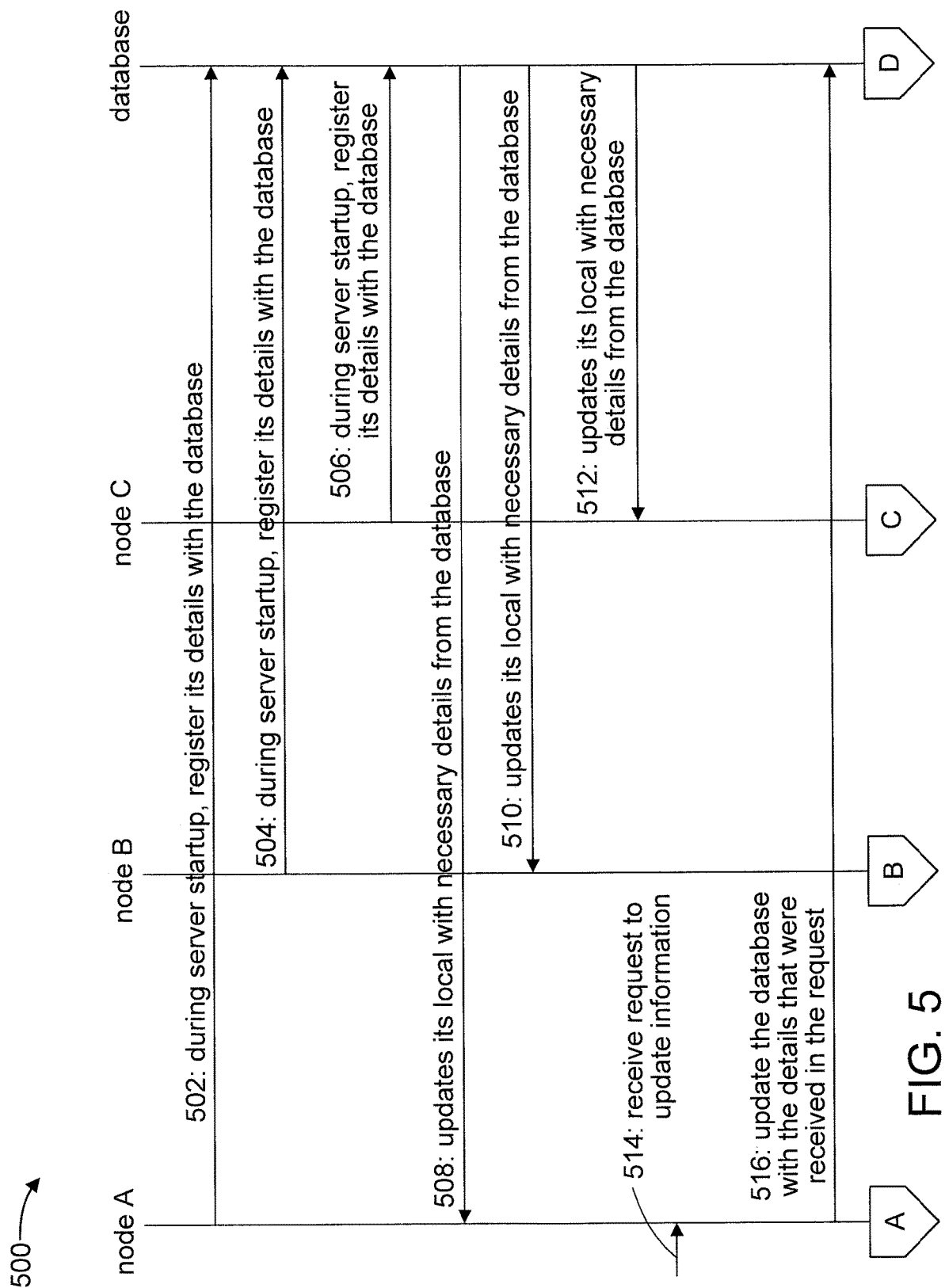
FIGS. 5-7 show the method of FIGS. 3-4 applied to a set of three nodes running multiple instances of an application in a cloud, in accordance with an embodiment of the present invention.
Figure 6:
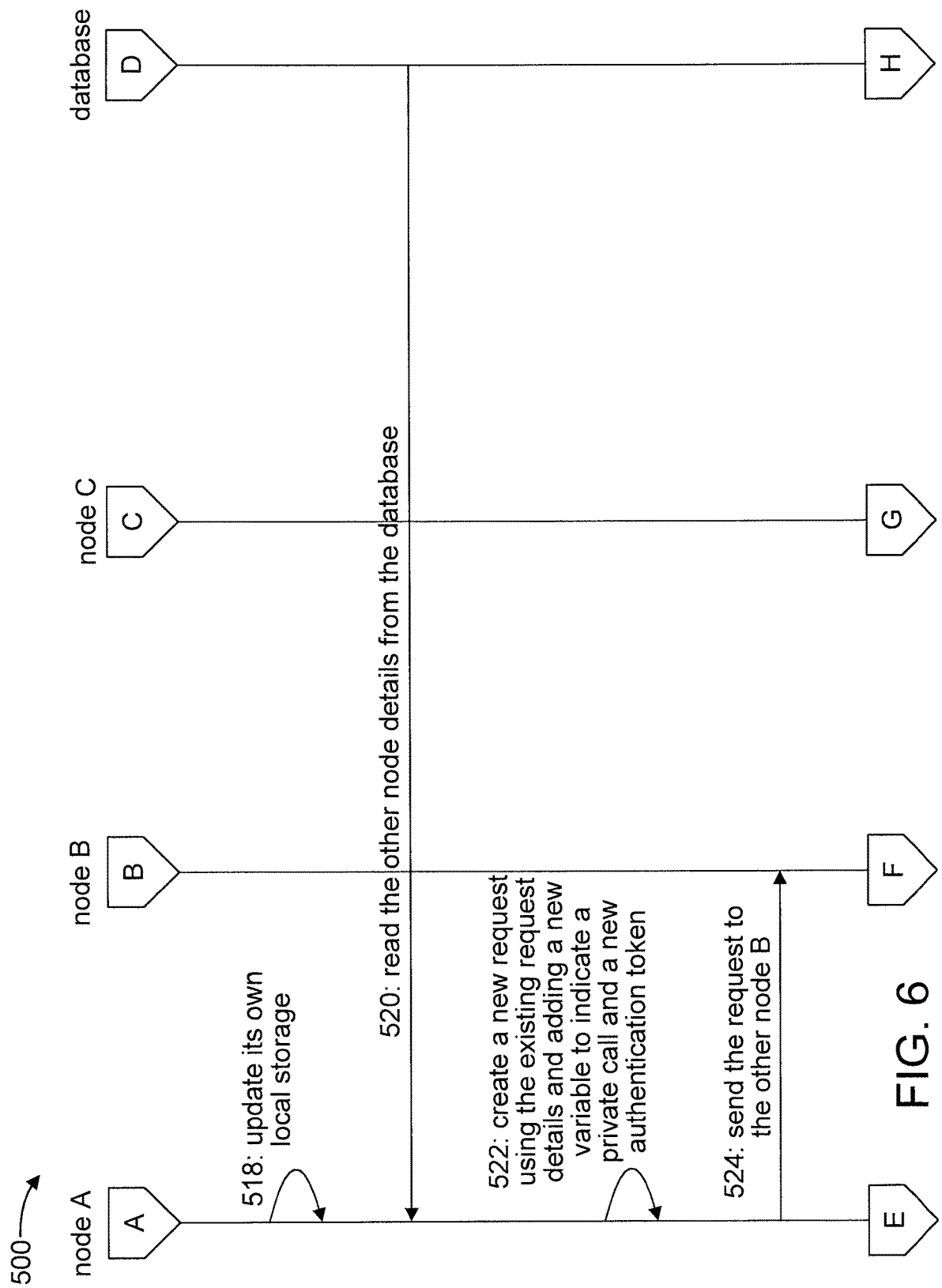
Figure 7:
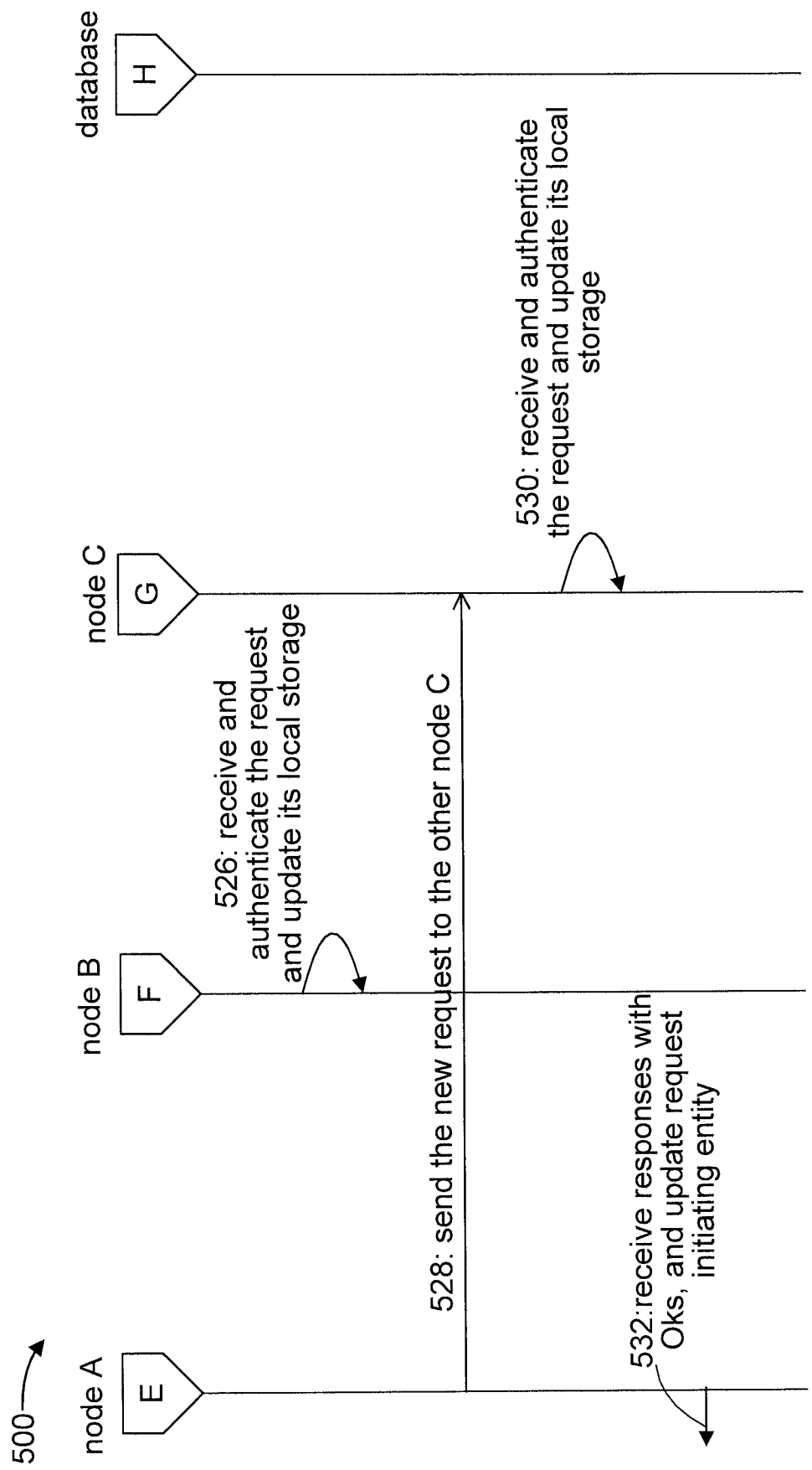
Figure 8:
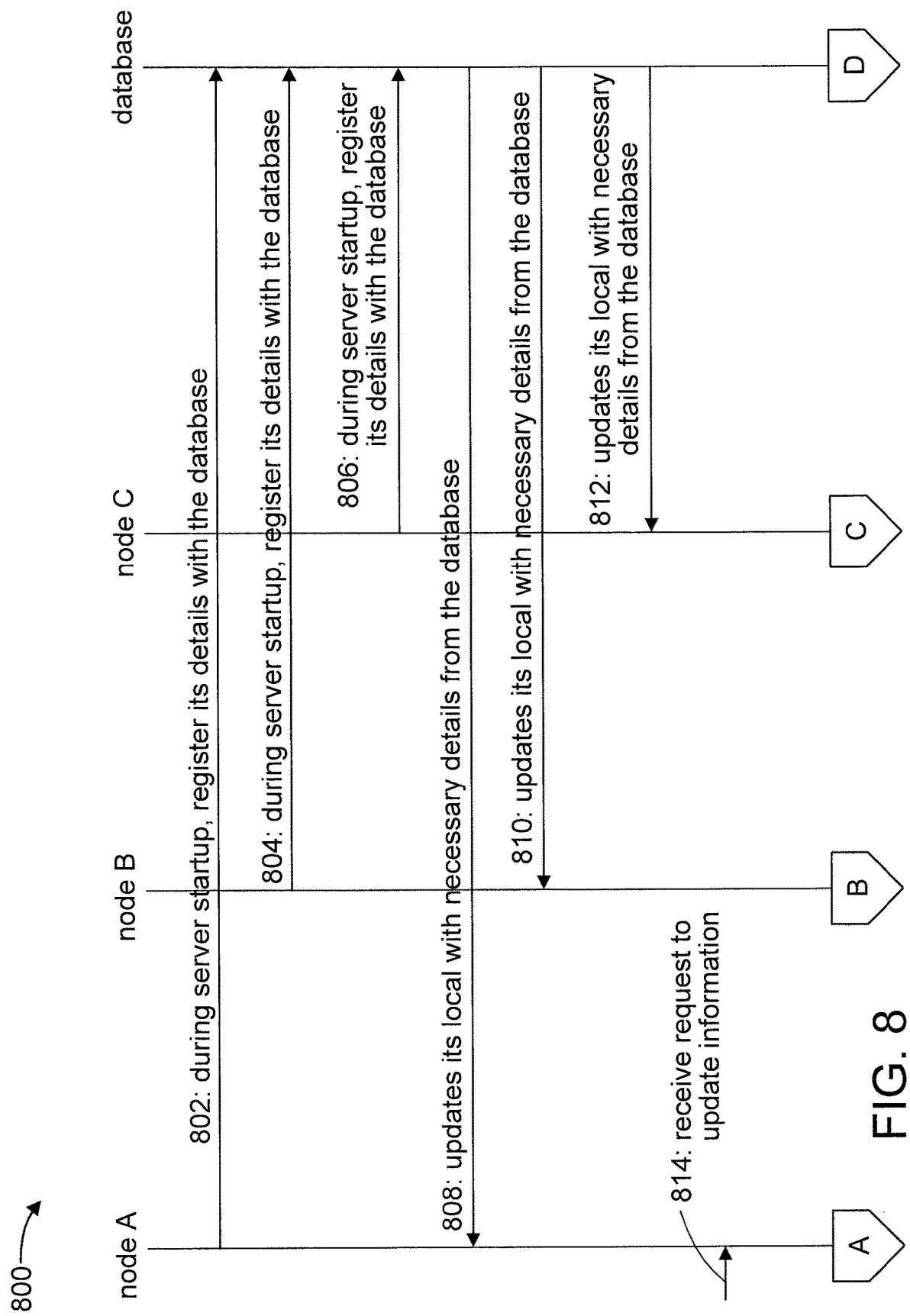
FIGS. 8-11 show an exemplary method for implementing a locking mechanism for synchronizing data across multiple instances of an application in a cloud, in accordance with an embodiment of the present invention.
Figure 9:
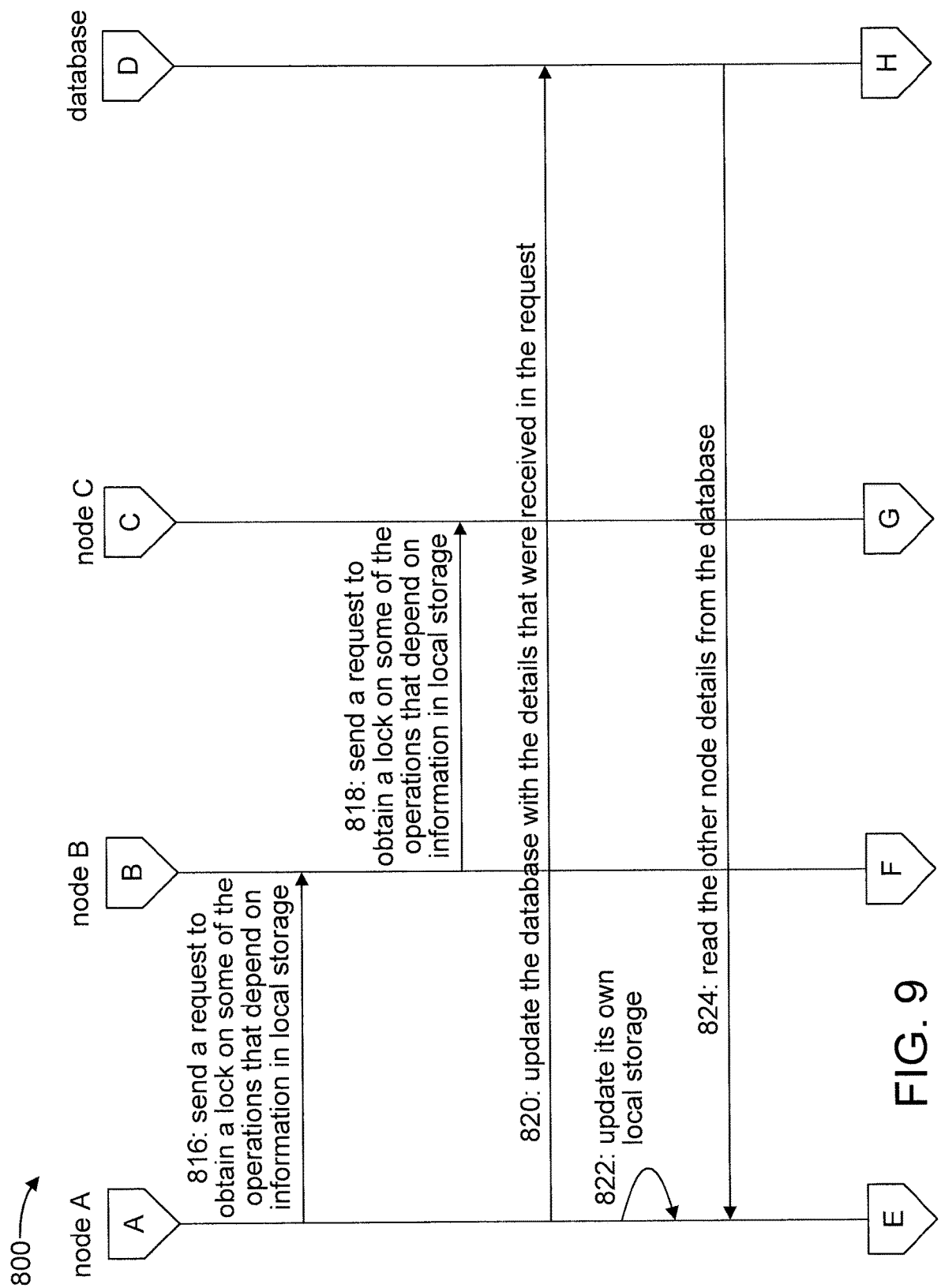
Figure 10:
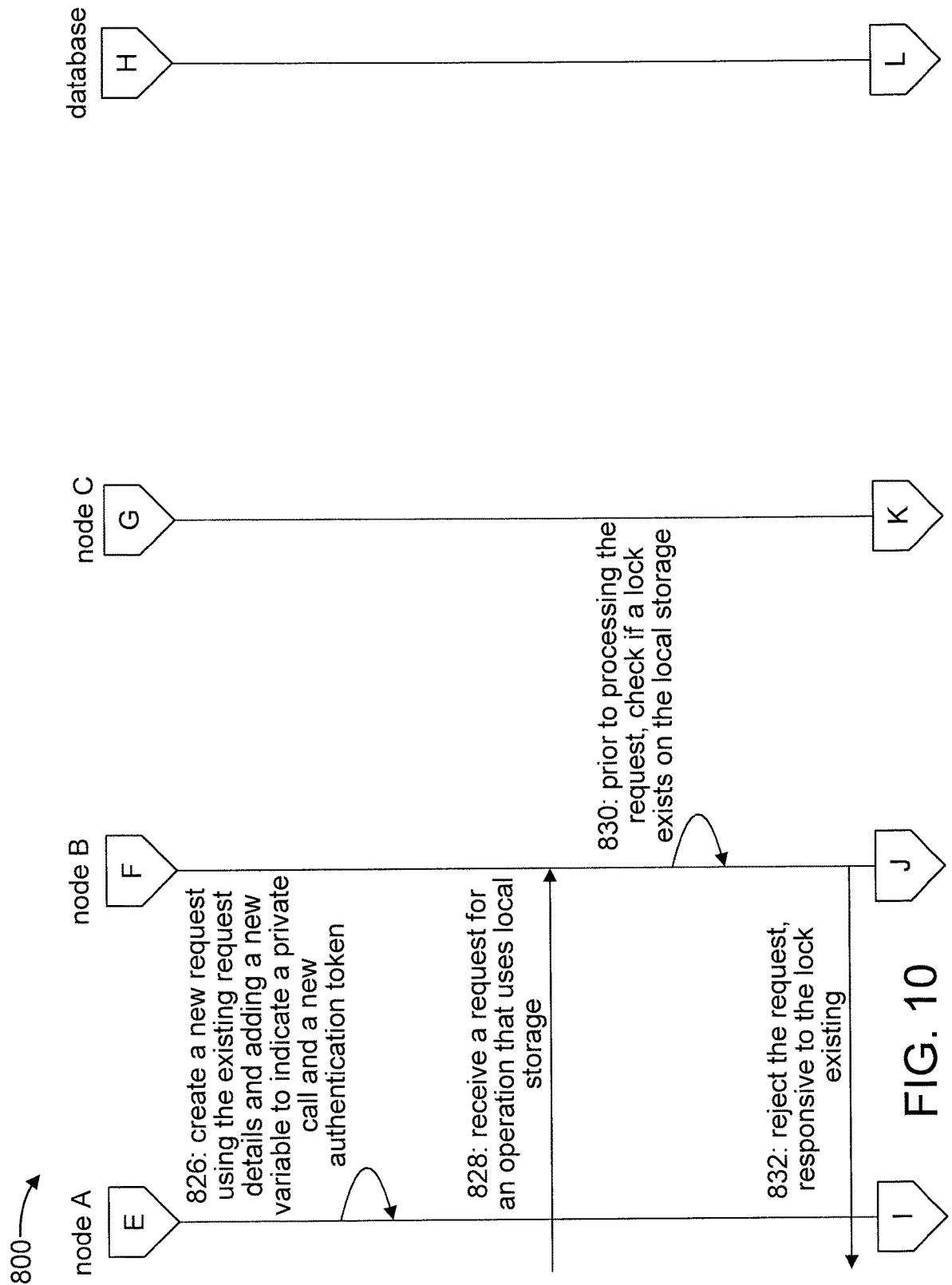
Figure 11:
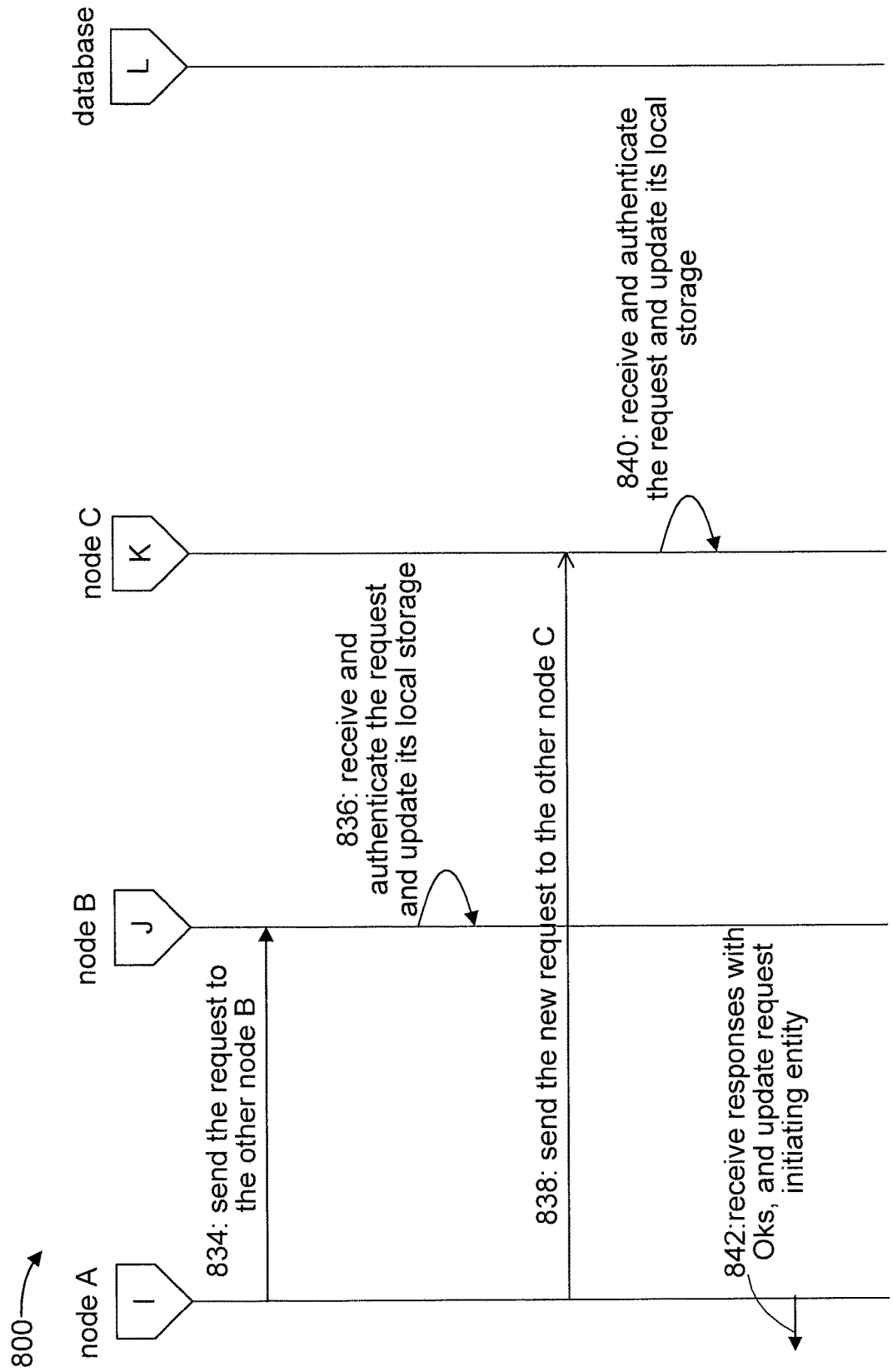

Further, it is to be appreciated that processing system 100 may perform at least part of the methods described herein including, for example, at least part of method 300 of FIGS. 3-4 and/or at least part of method 500 of FIGS. 5-7 and/or at least part of method 800 of FIGS. 8-11. Similarly, part or all of system 200 may be used to perform at least part of method 300 of FIGS. 3-4 and/or at least part of method 500 of FIGS. 5-7 and/or at least part of method 800 of FIGS. 8-11.

FIG. 2 shows an exemplary environment 200 to which the present invention can be applied, in accordance with an embodiment of the present invention.

The environment 200 at least includes a database 210 and a set of nodes 220. The database 210 and the set of nodes 220 are part of one or more cloud cluster systems (hereinafter "cloud cluster system") 290.

The database 210 can be, for example, a server.

In the example of FIG. 2, the set of nodes includes node A 221, node B 222, and node C 223. Each of nodes corresponds to a respective cluster of the cloud cluster system 290. In particular, node A 221 corresponds to cluster 291 of cloud cluster system 290, node B 222 corresponds to cluster 292 of cloud cluster system 290, and node C 223 corresponds to cluster 293 of cloud cluster system 290. However, it is to be appreciated that in other embodiments, all of the multiple nodes being synchronized can be in the same cluster. Moreover, it is to be appreciated that in other embodiments, the clusters can have different numbers of nodes therein.

Each of the nodes can be implemented by a respective server, where each of the servers includes a respective local memory. In particular, node A 221 includes local memory 251, node B 222 includes local memory 252, and node C includes local memory 253. The local memories 251, 252, and 253 can be implemented by caches or other types of memory (and are hereinafter interchangeably referred to as caches).

In environment 200, application data is synchronized across multiple instances 271 of an application 270 running on the nodes 220 of the cloud cluster system 290. In an embodiment, application data synchronization is achieved across the multiple instances using REpresentational State Transfer (REST) calls. However, other types of calls that expose resources can also be used by the invention, while maintaining the spirit of the present invention.

In the embodiment of FIG. 2, node A 221 includes a respective instance 221A, node B 222 includes a respective instance 222A, and node C 223 includes a respective instance 223A.

While the example of FIG. 2 is essentially limited to a single instance on each of the nodes in cloud cluster system 290 for the sake of illustration and clarity, it is to be appreciated that there can be a multiple nodes/instances on multiple cluster systems, which need the application data synchronization.

The application 270 running on each of the nodes in each of the clusters 291, 292, 293 would register their details with the database 210 when the application context is initialized. When these application contexts are destroyed, the application 270 would un-register their details. This would help inform of which nodes are the available nodes of the system 290 at any given point. When a synchronization of data is required between the nodes 220, and the request lands on a node for the data update, that node takes care of updating the other nodes using the REST calls. To make these REST calls, the details in the database 210 are used. These REST calls are made to the other nodes, and the data in the cache is updated. This cache can be, for example, an in-memory cache, thus eliminating the need to go to the database for the updates. The complete data to be updated is available in the node where the request landed, and it takes the responsibility to update the other nodes accordingly, so that the costly database calls are avoided.

Thus, the present invention provides a solution which can be controlled by the application 270 and is not costly to implement.

In the embodiment shown in FIG. 2, the elements thereof are interconnected by a network(s) 201. However, in other embodiments, other types of connections can also be used. Moreover, in an embodiment, at least one of the elements of environment 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIGS. 3-4 show an exemplary method 300 for synchronizing data across multiple instances of an application in a cloud, in accordance with an embodiment of the present invention.

At step 302, register each node and the details for each node in a database, during an initialization stage of method 300.

At step 304, read the required information during server startup and store the required information in a local storage. The required information can include, but is not limited to, for example, credentials, and so forth. The local storage can be implemented using, but is not limited to, for example, a hash map.

At step 306, receive an update to the required information (e.g., the credentials), by one of the nodes.

At step 308, update the database and a local storage device (e.g., a cache, etc.) with the update to the required information (received at step 306), by the node that received the update (at step 306).

At step 310, create a new request, with the body of the existing request, by adding a new variable to denote an internal request (where internal request refers to a request amongst the nodes and not an external client), and by adding an authentication token (e.g., an oAuth token).

At step 312, send the request to the other nodes, by reading the details of the other nodes from the database.

At step 314, receive and authenticate the request, by the other nodes.

At step 316, process the request, with the new variable in the request indicating that the update is for local storage.

At step 318, upon receiving an operational request by any of the nodes, referring to local storage (instead of the database), in order to respond to the operational request. The operational request can be, but is not limited to, a "send message" request, and so forth.

FIGS. 5-7 show the method 300 of FIGS. 3-4 applied to a set of three nodes running multiple instances of an application in a cloud, in accordance with an embodiment of the present invention. In an embodiment, the set of three nodes can be node A 221, node B 222, and node C 223 of FIG. 2. Of course, method 300 can be applied to other node configurations, and other numbers of nodes, as readily appreciated by one of ordinary skill in the art given the teachings of the present invention provided herein, while maintaining the spirit of the present invention.

At step 502, during server startup, register the details of node A in the database. The details can include, for example, IP and port numbers.

At step 504, during server startup, register the details of node B in the database. The details can include, for example, IP and port numbers.

At step 506, during server startup, register the details of node C in the database. The details can include, for example, IP and port numbers.

At step 508, update, by node A, its local storage with necessary details from the database.

At step 510, update, by node B, its local storage with necessary details from the database.

At step 512, update, by node C, its local storage with necessary details from the database.

At step 514, receive, from an external entity by node A, a request to update information (e.g., credentials).

At step 516, update, by node A, the database with the details that were received in the request.

At step 518, update, by node A, its own local storage.

At step 520, read the other node details from the database.

At step 522, create, by node A, a new request using the existing request details and adding a new variable to indicate a private call and a new authentication (e.g., oAuth) token.

At step 524, send the new request to the other node B.

At step 526, receive and authenticate the request and update its local storage, by node B.

At step 528, send the new request to the other node C.

At step 530, receive and authenticate the request and update its local storage, by node C.

At step 532, receive responses with Oks from requests made to other nodes, and update the entity that initiated the request at 516.

Thus, in an embodiment, an application running on each node, during the initialization of the context, would register their details into a database. When the request lands on any one of the nodes, the node receiving the request takes responsibility to make specific private REST API calls, to update the state of the other nodes. For example, a mobile component running on a middleware needs to remember the credentials of the mobile messaging providers. Given the case that these credentials are required for every mobile notification, or some of the other functionalities, and that these credentials are not getting modified quiet often, it does not make much sense to retrieve the credentials from the database every time the credentials are needed. Thus, a hash map implementation can be used to remember these credentials.

When a request to update these credentials lands on (is received by) one of the nodes, that node updates the database for the requested operation of updating the credentials. However, the other nodes are unaware of this request and of the update database resulting from the request. Consider for example, that there are three nodes in a cluster where the application is running, and the request for the update of the credentials landed in node A, it is the node A which apart from updating the database and its own hash map, will make a private (not exposed to the clients) REST API, that is secured by an authentication standard (e.g., the oAuth Standard), which will be sent to the other registered nodes (in the preceding example, nodes B and C). Now once the other nodes (nodes B and C) receive the request from node A, they do not go to the database for updates, instead the request will contain the necessary details. One of the possible implementation could be that the node A can send the same request body to nodes B and C. Apart from the same body that was received as a request, node A will just add a new field, which indicates that the request is coming within the nodes and not from any external client. For making this call private and more secure, node A can update the oAuth token (which is used only between nodes and not exposed outside) with a new scope to the other nodes. This request once authenticated by the other nodes, will update their hash map. Thus, when there is a notification to be sent using these credentials, the nodes do not have to go to the database as their hash map cache is always updated.

Regarding an authentication standard to be used in accordance with the present invention, as noted above, oAuth can be used. In general, OAuth provides clients a "secure delegated access" to server resources on behalf of a resource owner. oAuth specifies a process for resource owners to authorize third-party access to their server resources without sharing their credentials. Using Hypertext Transfer Protocol (HTTP), OAuth essentially allows access tokens to be issued to third-party clients by an authorization server, with the approval of the resource owner. The third party clients can then use the access token to access the protected resources hosted by the resource server. It is to be appreciated that while oAuth is described with respect to one or more embodiments of the present invention provided herein, the present invention is not limited to oAuth. That is, given the teachings of the present invention provided herein, one of ordinary skill in the art will contemplate oAuth and other authentication standards to which the present invention can be applied, while maintaining the spirit of the present invention. In an embodiment, irrespective of which particular authentication standard is used, it is preferable that the authentication standard employs tokens for use as described herein. For example, it is preferable to employ an authentication standard that employs tokens that are only known amongst the nodes and are not exposed to an external clients of the nodes.

A description will now be given of a locking mechanism, in accordance with an embodiment of the present invention.

A request lock can be used when the above process is going on. The request lock can be used because, for example, consider that node A received a request to update the local storage and database, and node A sends a new request to the other nodes B and C, as mentioned in the above implementation. In the meantime, if there is a new request to send notifications or any other request occurs which uses the details in the local storage which has old information, the request would fail as the information is older. Thus, the present invention can either reject the incoming requests in the meantime, or can wait until the update happens, whichever is applicable depending upon the implementation. If response time is important for the application at any given point in time, may the incoming requests in the meantime can be rejected.

FIGS. 8-11 show an exemplary method 800 for implementing a locking mechanism for synchronizing data across multiple instances of an application in a cloud, in accordance with an embodiment of the present invention.

At step 802, during server startup, register the details of node A in the database. The details can include, for example, IP and port numbers.

At step 804, during server startup, register the details of node B in the database. The details can include, for example, IP and port numbers.

At step 806, during server startup, register the details of node C in the database. The details can include, for example, IP and port numbers.

At step 808, update, by node A, its local storage with details from the database.

At step 810, update, by node B, its local storage with details from the database.

At step 812, update, by node C, its local storage with details from the database.

At step 814, receive, from an external entity by node A, a request to update information (e.g., credentials).

At step 816, send, from node A to node B, a request to obtain a lock on some of the operations that depend on the information in the local storage of node B. In an embodiment, obtaining a lock may involve setting a variable value that is looked up in order to check the status of the lock. While a variable value is described for illustrative purposes, other approaches to obtaining a lock can also be used in accordance with the teachings of the present invention, while maintaining the spirit of the present invention.

At step 818, send, from node A to node C, a request to obtain a lock on some of the operations that depend on the information in the local storage of node C.

At step 820, update, by node A, the database with the details that were received in the request (by node A).

At step 822, update, by node A, its own local storage with the details that were received in the request (by node A).

At step 824, read the other node details from the database.

At step 826, create, by node A, a new request using the existing request details and adding a new variable to indicate a private call and a new authentication (e.g., oAuth) token.

At step 828, receive, from an external entity by node B, another request for an operation that uses local storage.

At step 830, prior to processing the other request received at step 828, check if a lock exists on the local storage in node B.

At step 832, reject the request responsive to the lock existing on the local storage in node B. In such a case, steps 522-534 shown in FIGS. 6-7 (and relabeled steps 834-842 in the embodiment described with respect to method 800 of FIG. 8) are essentially performed (as the method continues to update local storage (cache) in order to complete the request, initially received at step 814, and from which, the new request was created at step 826). The point is that while the local caches of the nodes are being updated, any new request (here the other request received at step 828) will be either delayed or rejected.

At step 834, send the new request to the other node B.

At step 836, receive and authenticate the request and update its local storage, by node B.

At step 838, send the new request to the other node C.

At step 840, receive and authenticate the request and update its local storage, by node C.

At step 842, receive responses with Oks from requests made to other nodes, and update the entity that initiated the request at 814.

Further regarding method 800, a lock check is not done for requests from node A. The lock check is only performed when there is a new request from some other entity/source (e.g., such as, but not limited to, a REST API call, or a service call) which reaches the node B or C (which is not the node which actually received the initial request (at step 814) to update the credentials which, in the examples herein, is node A). Since the credentials update is happening or yet to happen in nodes B or C, the request is rejected. Thus, the steps described with respect to FIGS. 5, 6, and 7 will continue to happen, but if there is a request that lands in node B or node C between any of the operations shown and described with respect to FIGS. 5, 6, and 7, then the lock is always checked and the request (that lands in node B or node C) is responded to accordingly. It is to be appreciated that the scenario depicted in FIGS. 8-11 is just one of many possible scenarios to which the present invention can be applied, as readily appreciated by one of ordinary skill in the art given the teachings of the present invention provided herein, while maintain the spirit of the present invention.

A description will now be given regarding an exemplary scenario to which the present invention can be applied, in accordance with an embodiment of the present invention.

IBM's MobileFirst Platform Foundation includes a Push Notification service. The same service is available as an IBM Bluemix® Service. In both these implementations (on-premises and in the cloud), there can be a need for Google® Cloud Messaging (GCM) or Apple® Push Notification Service (APNS) credentials to be maintained by the system.

These credentials are not modified very often, but are needed for every push notification sent by the mobile application. Thus, these are identified as "To be cached" data required for the push notifications to perform better with better scalability, be it on-premises or in the cloud.

Thus, this data is cached in all nodes of the cluster and when an update request happens in one of the nodes, the other nodes are updated using the REST API. Of course, given the teachings of the present invention provided herein, other cloud services which resemble this architecture can use the present invention to improve performance.

The preceding and other scenarios to which the present invention can be applied are readily determined by one of ordinary skill in the art, given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
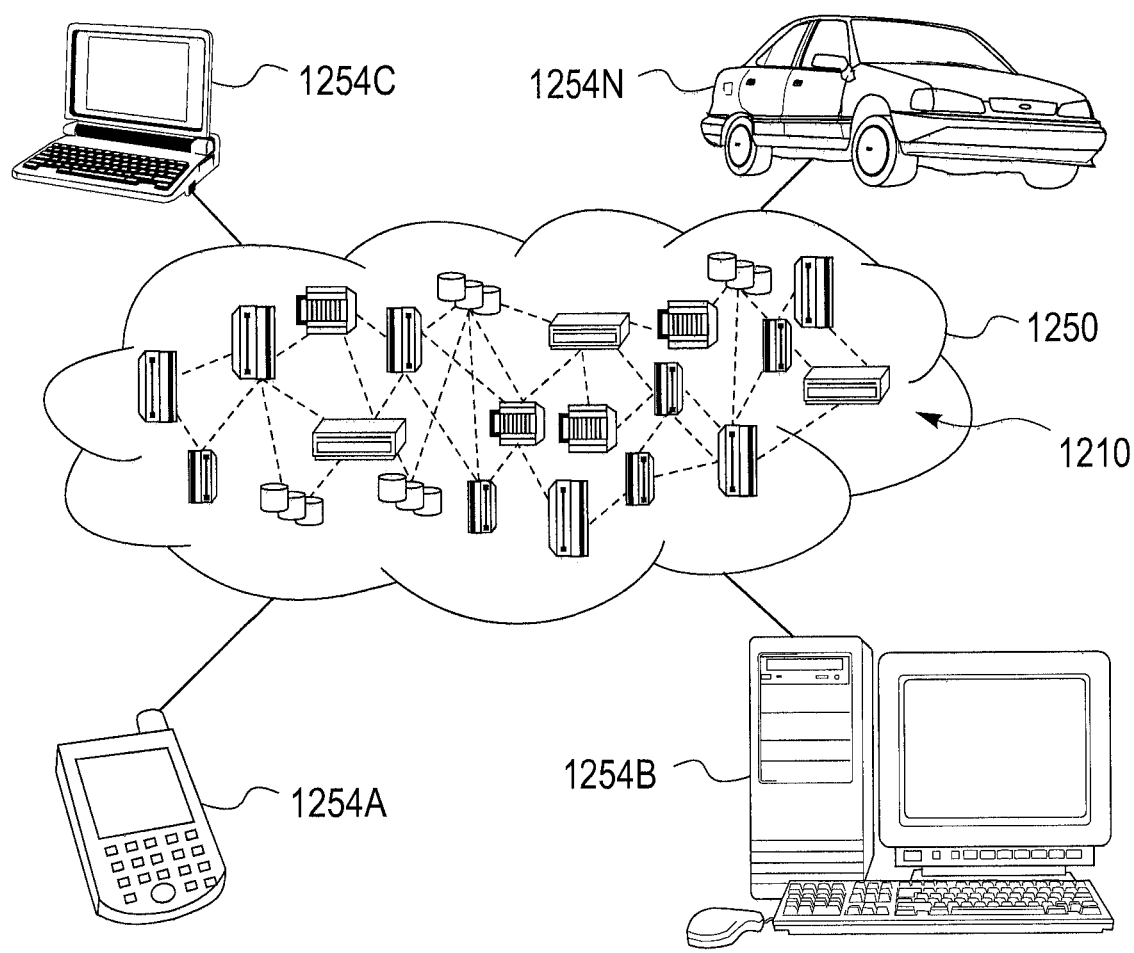
FIG. 12 shows an exemplary cloud computing environment, in accordance with an embodiment of the present invention.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
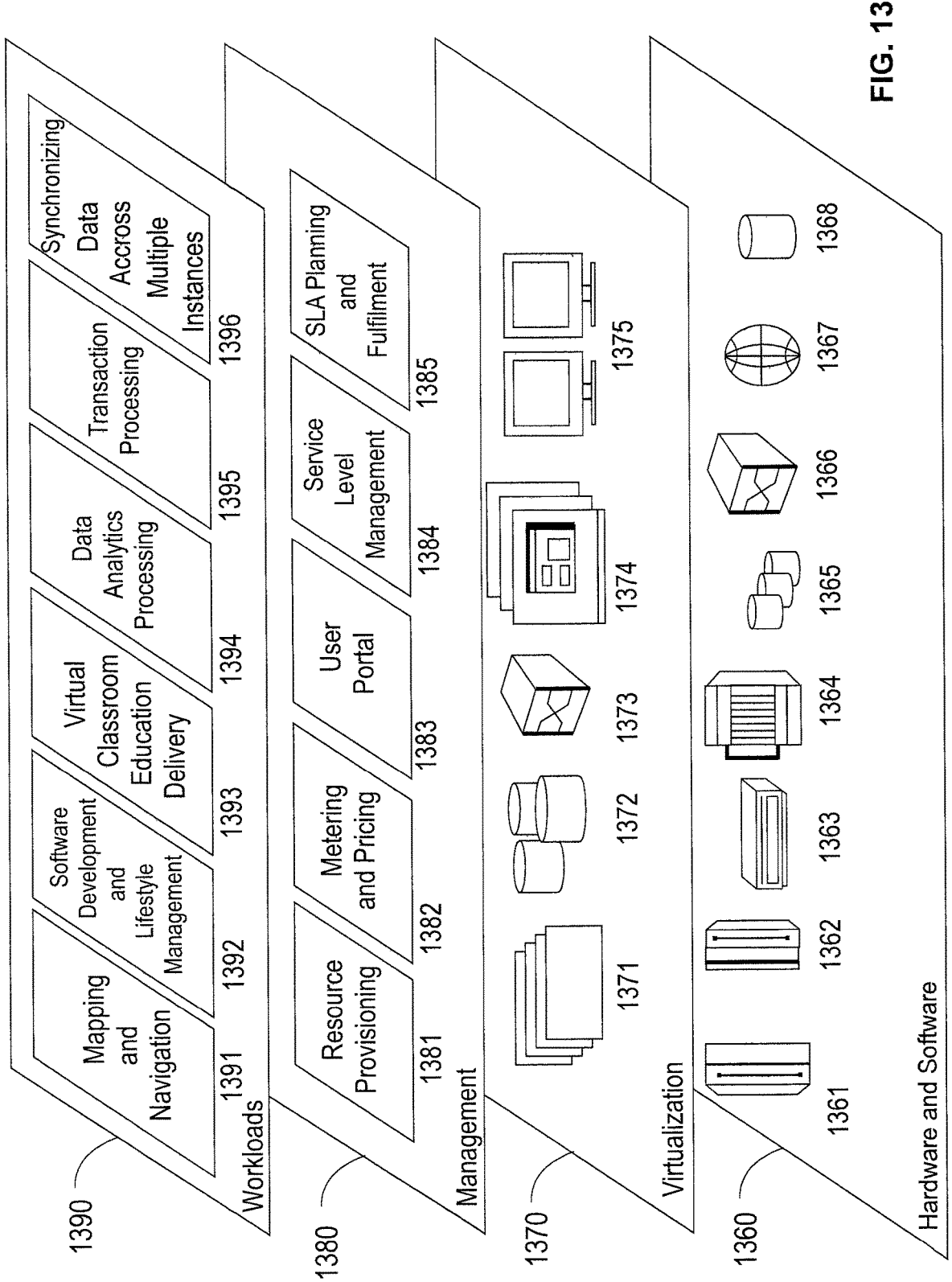
FIG. 13 shows an exemplary set of functional abstraction layers provided by the cloud computing environment shown in FIG. 12, in accordance with an embodiment of the present invention.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and synchronizing data across multiple instances of an application in a cloud 1396.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for data synchronization, comprising:
   registering, in a database accessible by a plurality of nodes included in a cloud cluster system, node information for each of the plurality of nodes during an initialization of an application context for an application having at least one instance of multiple instances running on each of the plurality of nodes;

storing an update for data in (i) a local storage of a given one of the plurality of nodes and (ii) the database, responsive to a request to update the data received by the given one of the plurality of nodes;

generating a modified version of the request that includes details for the updated data; and calling an application programming interface (API) to update a state of respective local storages for other ones of the plurality of nodes with the update responsive to the modified version of the request, such that the update is synchronized across the at least one instance of the multiple instances running on each of the plurality of nodes.

2. The method of claim 1, wherein the local storage is implemented using a hash map.

3. The method of claim 1, wherein the updated information comprises credential information.

4. The method of claim 1, further comprising applying a locking mechanism to the local storage of the other ones of the plurality of nodes responsive to the request to update the data.

5. The method of claim 4, wherein the locking mechanism applies to a cached object level in the local storage of the other ones of the plurality of nodes.

6. The method of claim 1, further comprising registering node information for a new node, in addition to the plurality of nodes, and instantiating a new instance of the application to run on the new node.

7. The method of claim 1, further comprising unregistering node information for a particular one of the plurality of nodes, responsive to the particular one of the plurality of nodes being removed from the cloud cluster system.

8. The method of claim 1, wherein said calling step uses a Representational State Transfer (REST) API call that is unexposed to any external clients of the plurality of nodes.

9. The method of claim 1, wherein said calling step uses a Representational State Transfer (REST) API call that is secured using an authentication standard.

10. The method of claim 9, wherein the authentication standard is token based and configured to keep the token unexposed to any external clients of the plurality of nodes.

11. The method of claim 1, wherein the modified version of the request that includes the details for the updated data enables the other ones of the plurality of nodes to receive the update without accessing the database by bypassing the database and retrieving the update from the local storage of the given one of the plurality of nodes, responsive to an operational request for the update sent to the given one of the plurality of nodes.

12. The method of claim 1, wherein the modified version of the request including an indication that the modified version of the request is originating from one of the plurality of nodes as opposed to an external client of any of the plurality of nodes.

13. The method of claim 1, further comprising bypassing the database and retrieving the update from the local storage of the given one of the plurality of nodes, responsive to an operational request for the update sent to the given one of the plurality of nodes.

14. A computer program product for data synchronization, the computer program product comprising a non-transitory computer readable storage medium having program instructions embodied therewith, the program instructions executable by a computer to cause the computer to perform a method comprising:

registering, in a database accessible by a plurality of nodes included in a cloud cluster system, node information for each of the plurality of nodes during an initialization of an application context for an application having at least one instance of multiple instances running on each of the plurality of nodes;

storing an update for data in (i) a local storage of a given one of the plurality of nodes and (ii) the database, responsive to a request to update the data received by the given one of the plurality of nodes;

generating a modified version of the request that includes details for the updated data; and calling an application programming interface (API) to update a state of respective local storages for other ones of the plurality of nodes with the update responsive to the modified version of the request, such that the update is synchronized across the at least one instance of the multiple instances running on each of the plurality of nodes.

15. The computer program product of claim 14, wherein said calling step uses a Representational State Transfer (REST) API call that is secured using an authentication standard.

16. The computer program product of claim 14, wherein the authentication standard is token based and configured to keep the token unexposed to any external clients of the plurality of nodes.

17. The computer program product of claim 14, wherein the modified version of the request that includes the details for the updated data enables the other ones of the plurality of nodes to receive the update without accessing the database by bypassing the database and retrieving the update from the local storage of the given one of the plurality of nodes, responsive to an operational request for the update sent to the given one of the plurality of nodes.

18. The computer program product of claim 14, wherein the modified version of the request including an indication that the modified version of the request is originating from one of the plurality of nodes as opposed to an external client of any of the plurality of nodes.

19. The computer program product of claim 14, wherein the method further comprises bypassing the database and retrieving the update from the local storage of the given one of the plurality of nodes, responsive to an operational request for the update sent to the given one of the plurality of nodes.

20. A cloud cluster system, comprising:

a plurality of nodes; and a database accessible by the plurality of nodes, wherein each of the plurality of nodes has a local storage and is configured to register its node information in the database during an initialization of an application context for an application having at least one instance of multiple instances running on each of the plurality of nodes, wherein the plurality of nodes are further configured such that responsive to a request to update data received by any given one of the plurality of nodes, the given one of the plurality of nodes:

(a) stores an update for the data in (i) the local storage of the given one of the plurality of nodes and (ii) the database, (b) generates a modified version of the request that includes details for the updated data, and (c) calls an application programming interface (API) to update a state of respective local storages for other ones of the plurality of nodes with the update responsive to the modified version of the request, such that the update is synchronized across the at least one instance of the multiple instances running on each of the plurality of nodes.

\* \* \* \* \*